United States Patent
Takahashi (10) Patent No.: US 7,483,348 B2
(45) Date of Patent: Jan. 27, 2009

(54) RECORDING/REPRODUCING APPARATUS

(75) Inventor: Hironobu Takahashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 862 days.

(21) Appl. No.: 11/076,030

(22) Filed: Mar. 10, 2005

(65) Prior Publication Data

US 2005/0213448 A1 Sep. 29, 2005

(30) Foreign Application Priority Data

Mar. 11, 2004 (JP) ............................ P2004-068971

(51) Int. Cl.
*G11B 5/09* (2006.01)
(52) U.S. Cl. ............... 369/47.12; 386/52; 386/111; 386/125; 386/126
(58) Field of Classification Search ............ 369/47.12; 386/52, 111, 125, 126
See application file for complete search history.

(56) References Cited

U.S. PATENT DOCUMENTS

2001/0024562 A1 9/2001 Nomura et al. ............... 386/52
2003/0099460 A1 5/2003 Imada et al. .................. 386/52

FOREIGN PATENT DOCUMENTS

| JP | 2003-109307 A | 4/2003 |
|---|---|---|
| JP | 2003-224813 A | 8/2003 |
| JP | 2003-249008 A | 9/2003 |
| JP | 2003-289490 A | 10/2003 |
| JP | 2003-324680 A | 11/2003 |

*Primary Examiner*—Marvin M Lateef
*Assistant Examiner*—Brenda Bernardi
(74) *Attorney, Agent, or Firm*—Morgan, Lewis & Bockius LLP (57) ABSTRACT

A video/audio data is recorded in a first storage region of a first recording medium. The video/audio data is decoded and converted into the video/audio data with a prescribed bit rate. The video/audio data is encoded in a format of a second recording medium and recorded in a second region of the first recording medium. The video/audio data recorded in the second storage is copied onto the second recording medium. The saving priority of the video/audio data recorded in the first and the second storage region is evaluated. When shortage in the empty capacity of each of the first and the second storage region of the first recording medium is detected, the video/audio data with a lower saving priority is cancelled.

5 Claims, 8 Drawing Sheets

| Setting of High Speed Copying | |
|---|---|
| 1. Automated creation of copying data | ON |
| 2. Copying mode | LP (Four Hours) |

| Setting of Automated Clean-up | |
|---|---|
| 1. Automated clean-up | ON |
| 2. Saving period of recorded data | 7 Days |
| 3. Genre of recorded data not to be cancelled Preserved recording | |
| 4. Saving period of copying data | 14 Days |
| 5. Genre of copying data not to be cancelled Movie, drama, sports | |
| 6. Locking functiion | ON |

FIG. 4

| EVALUATION ITEM | PROGRAM A | | PROGRAM B | | PROGRAM C | | PROGRAM D | |
|---|---|---|---|---|---|---|---|---|
| 1. ON/OFF OF LOCKING FUNCTION | ON | | OFF | | OFF | | OFF | |
| 2. WATCHED? (DEGREE OF WATCHING) | 100% WATCHED | 0 | 98% WATCHED | 2 | NOT YET WATCHED | 100 | NOT YET WATCHED | 100 |
| 3. ELAPSED TIME AFTER RECORDING | 12 DAYS ELAPSED | 16 | 7 DAYS ELAPSED | 51 | ONE DAY ELAPSED | 93 | 8 DAYS ELAPSED | 44 |
| 4. COPIED ONTO DVD? | NOT YET COPIED | 10 | ALREADY COPIED | 0 | NOT YET COPIED | 10 | NOT YET COPIEDD | 10 |
| 5. GENRE | MOVIE | 100 | SPORTS | 100 | VARIETY | 0 | NEWS | 0 |
| 6. CONTINUOUSLY WATCHED? (NUMBER OF TIMES OF RECORDING) | RECORDED ONCE AT THE SAME TIME | 0 | NOT RECORDED AT THE SAME TIME | 0 | RECORDED SIX TIMES AT THE SAME TIME | 6 | RECORDED 18 TIMES AT THE SAME TIME | 18 |
| TOTAL OF EVALUATED SCORES | OUT OF CLEAN-UP | | 153 | | 209 | | 172 | |

RECORDING/REPRODUCING APPARATUS

BACKGROUND OF THE INVENTION

1. Field of the Invention

This invention relates to a recording/reproducing apparatus for recording/reproducing video/audio data, and more particularly to a recording/reproducing apparatus which converts the bit rate of video/audio data so that the video/audio data can be copied in a detachable recording medium at a high speed, and automatically cancel recorded video/audio data to prevent shortage in an empty capacity of a storage region of a recording medium.

2. Description of the Related Art

In recent years, television broadcasting has been digitized so that a television broadcasting program with a high image-quality or enhanced-definition in the digital broadcasting can be watched or viewed. However, the video/audio data with enhanced-definition has a very large quantity of data. For example, in the case of the video/audio data with a bit rate of 24 Mbps, the data quantity of the video/audio data for one hour is about 10.5 GB. In order to record such video/audio data, a large-capacity HDD (Hard Disk Drive) is required. Further, a DVD-R (Digital Versatile Disk-Recordable) and a DVD-RW (Digital Versatile Disk-ReWritable), because they have a storage capacity is 4.7 GB, can record the video/audio data for only about 27 minutes at the bit rate of 24 Mbps. Therefore, in copying the video/audio data with enhanced-definition recorded in the HDD, the bit rate of the video/audio data with enhanced-definition recorded in the HDD must be converted to provide a video/audio signal at a low bit rate to be copied in the DVD. Thus, in order to implement the copying, the working time approximately equal to the time taken for recording was required. Further, even with the large-capacity HDD, it has a limited storage region. This presents a problem that if a user does not erase the video/audio data recorded in the storage region of the HDD as the need arises, the storage region of the HDD becomes insufficient so that a television broadcasting program cannot be recorded in the storage region of the HDD.

As a background art, there has been proposed a technique for recording video/audio data encoded from a video/audio signal on a recording medium, reproducing the video/audio signal decoded from the video/audio data recorded on the recording medium and copying the video/audio data encoded again from the decoded video/audio signal on the recording medium at a high speed (for example, see JP-A-2003-224813).

Further, there has been also proposed a technique for reading information data in a shorter time than a real reproducing time from a detachable device for recording information data, writing the information data thus read in a disk recording medium and outputting the information data as reproduced data simultaneously with writing (for example, see JP-A-2003-249008).

Further, there has been also proposed a technique for acquiring an encoded statistical quantity, which is employed when image quality conversion embedded at predetermined intervals will be executed afterwards, in a stream of image data accumulated in a recording medium, and converting the image data into the image data with enhanced-definition on the basis of the encoded statistical quantity (for example, see JP-A-2003-324680).

Further, there has been also proposed a technique for changing digital data between the digital data of an external input signal and the digital data decoded from recorded data on the basis of an user's instruction, encoding one of the digital data of the external input signal and the digital data decoded from the recorded data and copying the encoded digital data while it is format-converted (for example, JP-A-2003-109307).

Furthermore, there has been also proposed a technique for setting a recording-holding condition of a broadcasting program to be recorded in order to record the broadcasting program with data relative to the recording-holding condition on a recording medium and checking the data relative to the recording-holding condition already recorded in order to erase the broadcasting program not satisfying the recording-holding condition among the broadcasting programs recorded on the recording medium (for example, JP-A-2003-289490).

SUMMARY OF THE INVENTION

However, among the techniques described as the background art, in accordance with the first technique, video/audio data encoded from a video/audio signal are recorded on a recording medium, the video/audio signal decoded from the video/audio data recorded on the recording medium is reproduced, and the video/audio data encoded again from the decoded video/audio signal can be copied on the recording medium at a high speed. However, this technique has a problem that it requires two decoders and two encoders and requires a high speed decoder and encoder employed for copying the video/audio data with a high speed while the video/audio data are reproduced.

In accordance with the second technique described above, information data in a shorter time than a real reproducing time are read from a detachable device for recording information data, the information data thus read are written in a disk recording medium and the information data can be outputted as reproduced data simultaneously with writing. However, this technique cannot solve the problem that if a user does not erase the video/audio data recorded in the storage region of the HDD as the need arises, the storage region of the HDD becomes insufficient so that a television broadcasting program cannot be recorded in the storage region of the HDD.

In accordance with the third technique described above, an encoded statistical quantity, which is employed when image quality conversion embedded at predetermined intervals will be executed afterwards, is acquired in a stream of image data accumulated in a recording medium and the image data can be converted into the image data with enhanced-definition on the basis of the encoded statistical quantity. However, like the second technique, this technique also cannot solve the above problem.

In accordance with the fourth technique described above, the digital data is changed between the digital data of an external input signal and the digital data decoded from recorded data on the basis of an user's instruction, one of the digital data of the external input signal and the digital data decoded from the recorded data is encoded and the encoded digital data can be copied while it is format-converted. Like the techniques described above, this technique also cannot solve the above problem.

In accordance with the fifth technique described above, a recording-holding condition of a broadcasting program to be recorded is set in order to record the broadcasting program with data relative to the recording-holding condition on a recording medium and the data relative to the recording-holding condition already recorded can be cancelled in order to erase the broadcasting program not satisfying the recording-holding condition among the broadcasting programs recorded on the recording medium. However, this technique presents a problem that since the set recording-holding condition is not automatically set and changed, even if shortage in the empty capacity of the storage region occurs, the broadcasting program other than those not satisfying the recording-holding condition is not canceled so that the video/audio data cannot be recorded.

The present invention has been accomplished in view of these problems of the background arts described above. One of objects of the present invention is to provide a recording/reproducing apparatus which can record video/audio data with enhanced-definition and convert the bit rate of video/audio data with enhanced-definition so that the video/audio data can be copied in a detachable recording medium at a high speed, and automatically cancel recorded video/audio data to prevent shortage in an empty capacity of a storage region of a recording medium.

According to a first aspect of the invention, there is provided a recording/reproducing apparatus having a function of recording/reproducing video/audio data in a first recording medium divided into a first and a second storage region and copying the video/audio data in a second recording medium which is detachable, the recording/reproducing apparatus including: a first recording unit that records the video/audio data in the first storage region of the first recording medium; a decoding unit that decodes the video/audio data; a resolution converting unit that converts the video/audio data decoded by the decoding unit into video/audio data with a prescribed bit rate; an encoder unit that encodes the video/audio data with the bit rate converted by the resolution converting unit in a format of the second recording medium; a second recording unit that records the video/audio data encoded by the encoder unit in the second storage region of the first recording medium; a copying unit that copies the video/audio data recorded in the second storage region of the recording medium into the second recording medium; an evaluating unit that evaluates, whenever a predetermined time elapses, respective evaluated scores for a plurality of evaluation items of the video/audio data recorded in the first and second storage region, and totals the evaluated scores to evaluate a saving priority of the video/audio data recorded the first and the second storage region of the first recording medium; a detecting unit that monitors, whenever a predetermined time elapses, empty capacities of the first and the second storage region of the first recording medium to detect shortage in the empty capacities of the first and the second storage region of the first recording medium; and a canceling unit that cancels, when shortage in the empty capacities of the first and the second storage region of the first recording medium is detected, the video/audio data with a lower saving priority recorded in the first and the second storage region of the first recording medium, exclusive of the video/audio data protection-set.

According to a second aspect of the invention, there is provided a recording/reproducing apparatus having a function of recording/reproducing video/audio data in a first recording medium divided into a first and a second storage region and copying the video/audio data in a second recording medium which is detachable, the recording/reproducing apparatus including: a first recording unit that records the video/audio data in the first storage region of the first recording medium; a decoding unit that decodes the video/audio data; a resolution converting unit that converts the video/audio data decoded by the decoding unit into video/audio data with a prescribed bit rate; an encoder unit that encodes the video/audio data with the bit rate converted by the resolution converting unit in a format of the second recording medium; a second recording unit that records the video/audio data encoded by the encoder unit in the second storage region of the first recording medium; a copying unit that copies the video/audio data recorded in the second storage region of the recording medium into the second recording medium; an evaluating unit that evaluates, whenever a predetermined time elapses, a saving priority of the video/audio data recorded the first and the second storage region of the first recording medium; a detecting unit that monitors, whenever a predetermined time elapses, empty capacities of the first and the second storage region of the first recording medium to detect shortage in the empty capacities of the first and the second storage region of the first recording medium; and a canceling unit that cancels, when shortage in the empty capacities of the first and the second storage region of the first recording medium is detected, the video/audio data with a lower saving priority evaluated by the evaluating unit.

According to a third aspect of the invention, there is provided a recording/reproducing method for a recording/reproducing apparatus having a function of recording/reproducing video/audio data in a first recording medium divided into a first and a second storage region and copying the video/audio data in a second recording medium which is detachable, the method including: recording the video/audio data in the first storage region of the first recording medium; converting the video/audio data decoded into the video/audio data with a prescribed bit rate; encoding the video/audio data with the bit rate converted in a format of the second recording medium and recording the video/audio data encoded in the second storage region of the first recording medium; reproducing the video/audio data recorded in the first storage region of the first recording medium when reproduction of the video/audio data is commanded; copying the video/audio data recorded in the second storage region of the recording medium into the second recording medium when copying of the video/audio data is commanded; evaluating, whenever a predetermined time elapses, respective evaluated scores for a plurality of evaluation items of the video/audio data recorded in the first and second storage region, and totaling the evaluated scores to evaluate a saving priority of the video/audio data; and detecting, whenever a predetermined time elapses, shortage in empty capacities of the first and the second storage region of the first recording medium, and canceling, when the shortage in the empty capacities of the first and the second storage region of the first recording medium is detected, the video/audio data with a lower saving priority from the first and the second storage region of the first recording medium, exclusive of the video/audio data protection-set.

BRIEF DESCRIPTION OF THE DRAWINGS

The above objects and advantages of the present invention will become more apparent by describing preferred exemplary embodiments thereof in detail with reference to the accompanying drawings, wherein.

DETAILED DESCRIPTION OF THE PREFERRED EMBODIMENTS

Now referring to the attached drawings as the occasion demands, an explanation will be given of a best mode for carrying out the invention.

Figure 1:
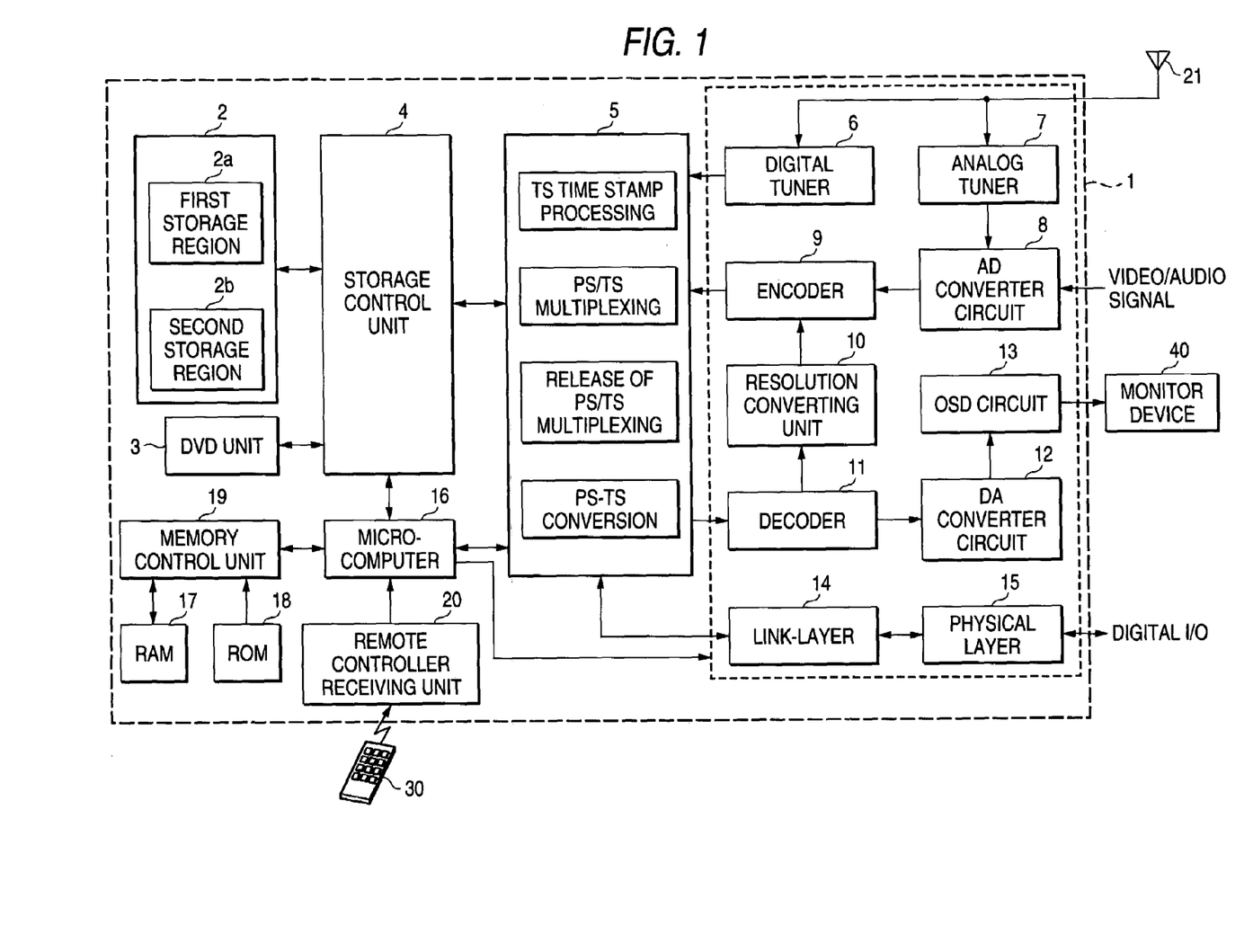
FIG. 1 is a block diagram showing the configuration of a recording/reproducing apparatus according to an embodiment of the present invention.
Figure 2:
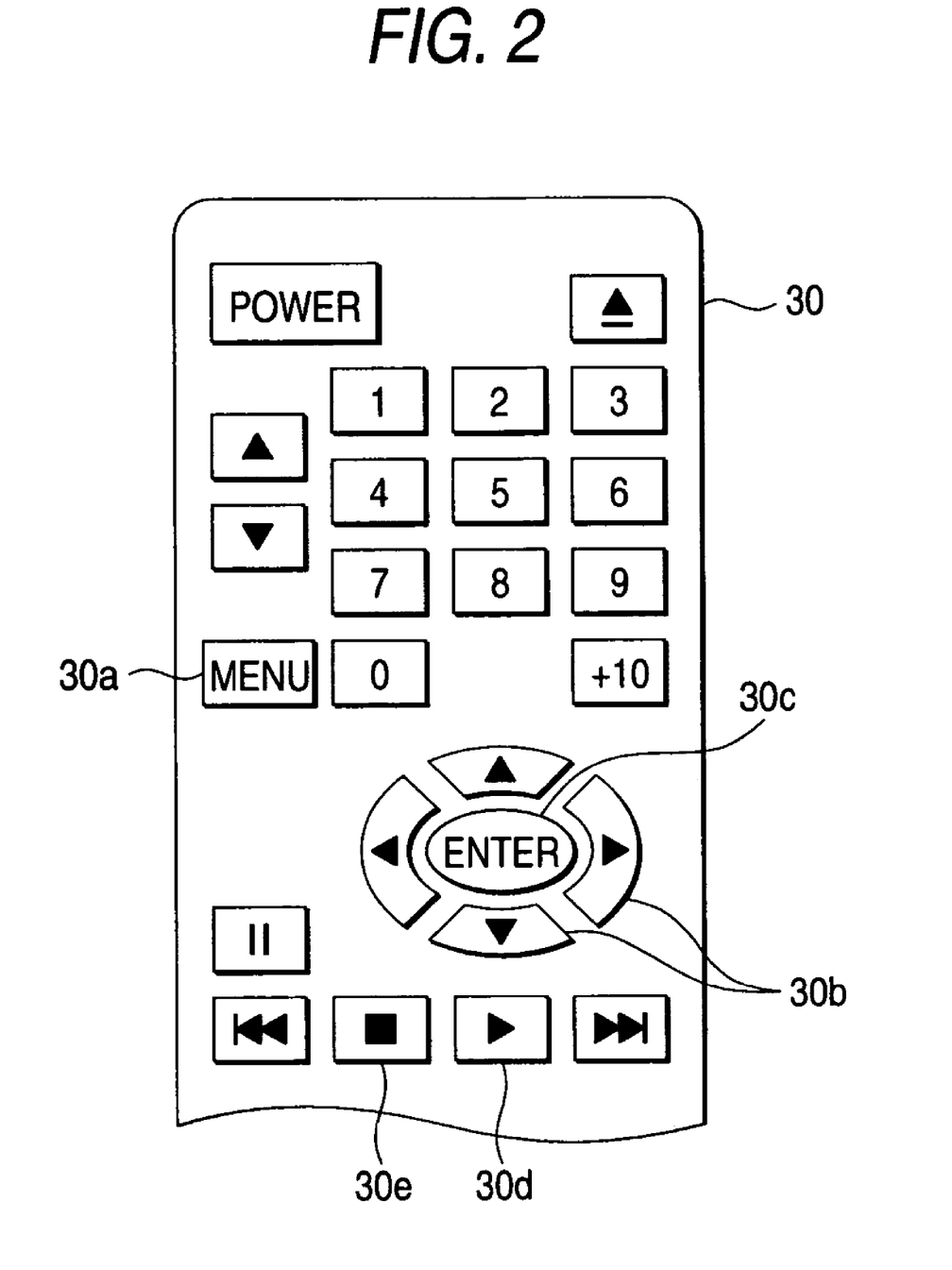
FIG. 2 is a view showing a remote controller of the recording/reproducing apparatus according to an embodiment.
Figure 3A:
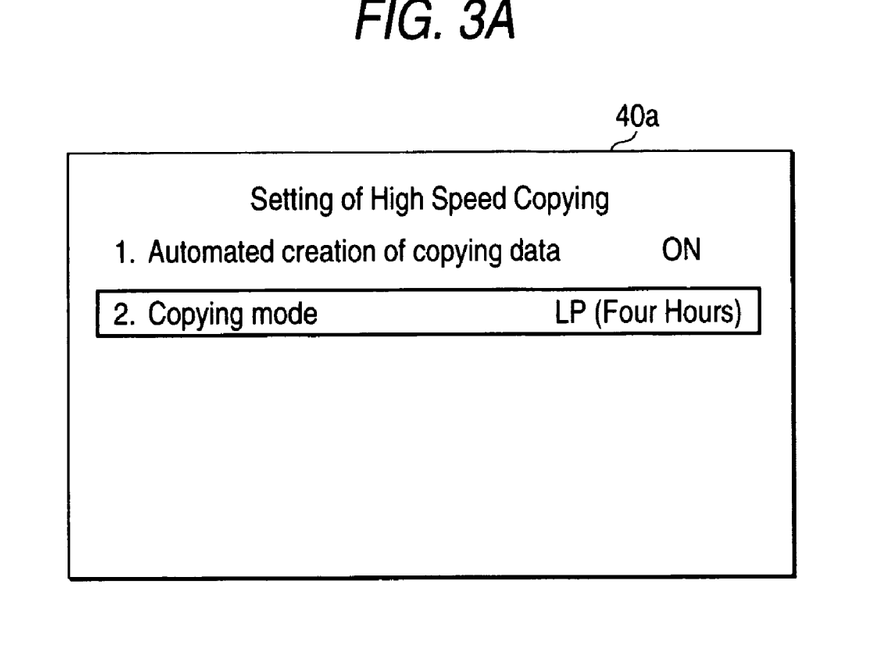
FIGS. 3A and 3B are views for explaining operation settings of the recording/reproducing apparatus according to an embodiment.
Figure 3B:
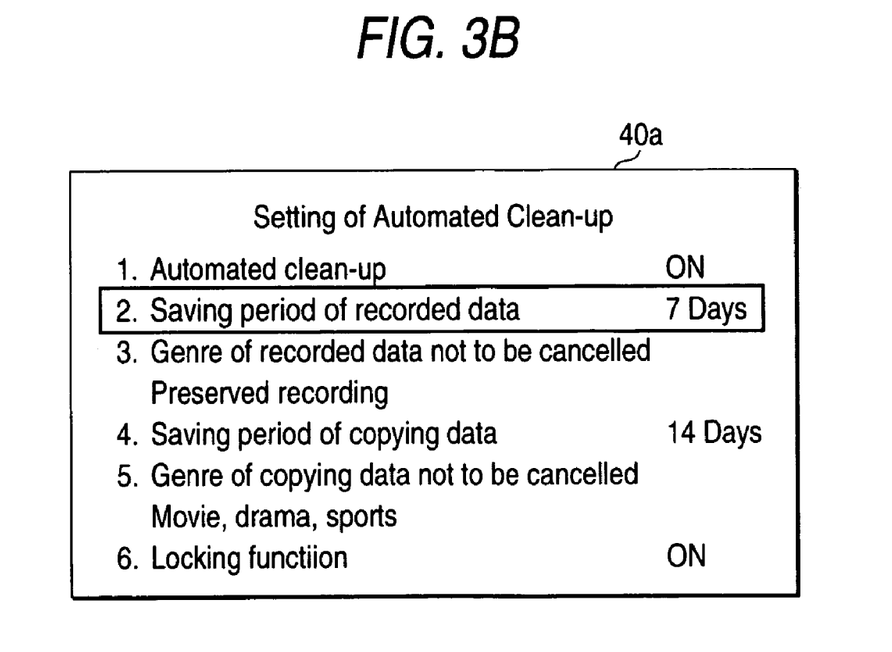
Figure 4:
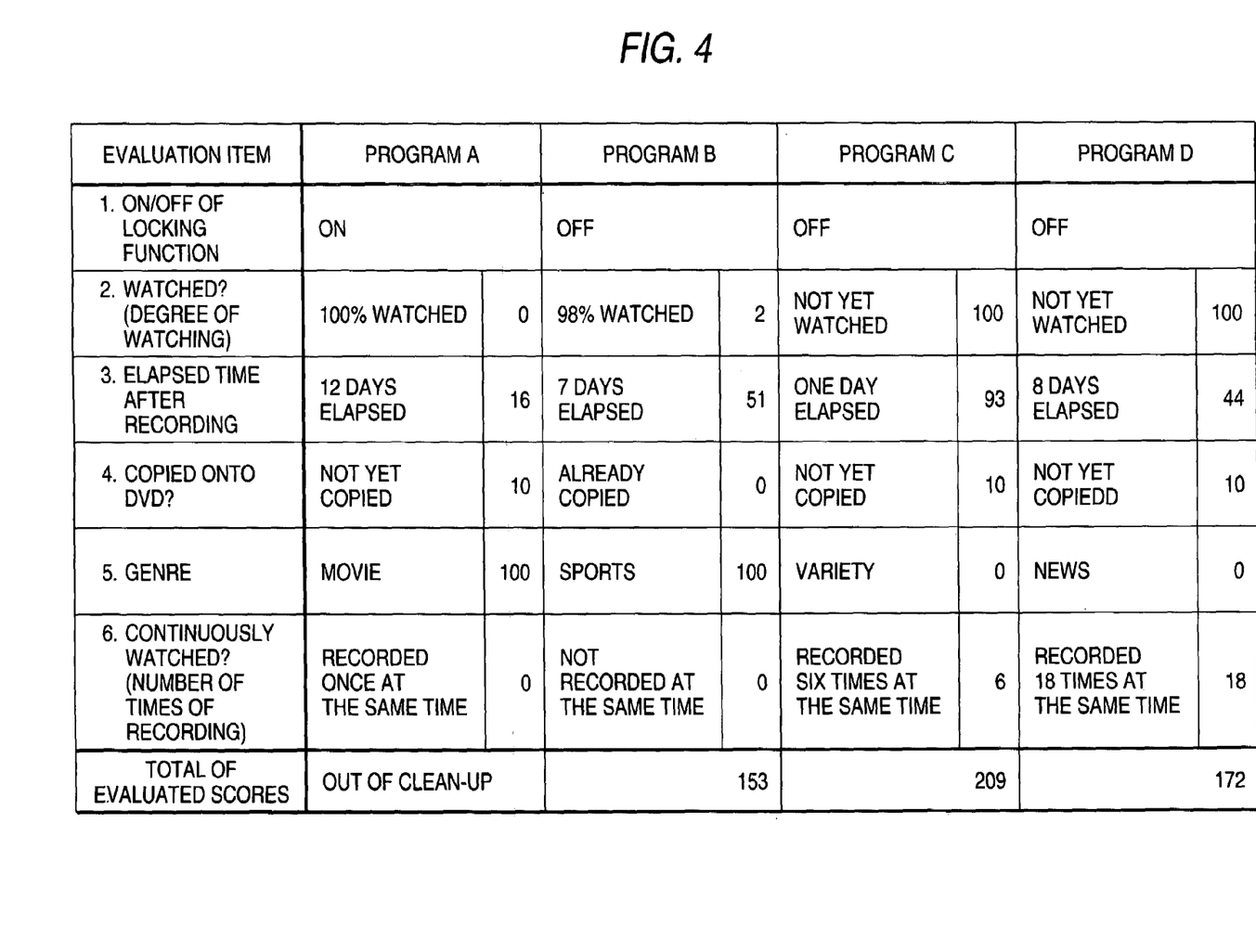
FIG. 4 is a view for explaining an example of evaluated scores of the recording/reproducing apparatus according to an embodiment.
Figure 5:
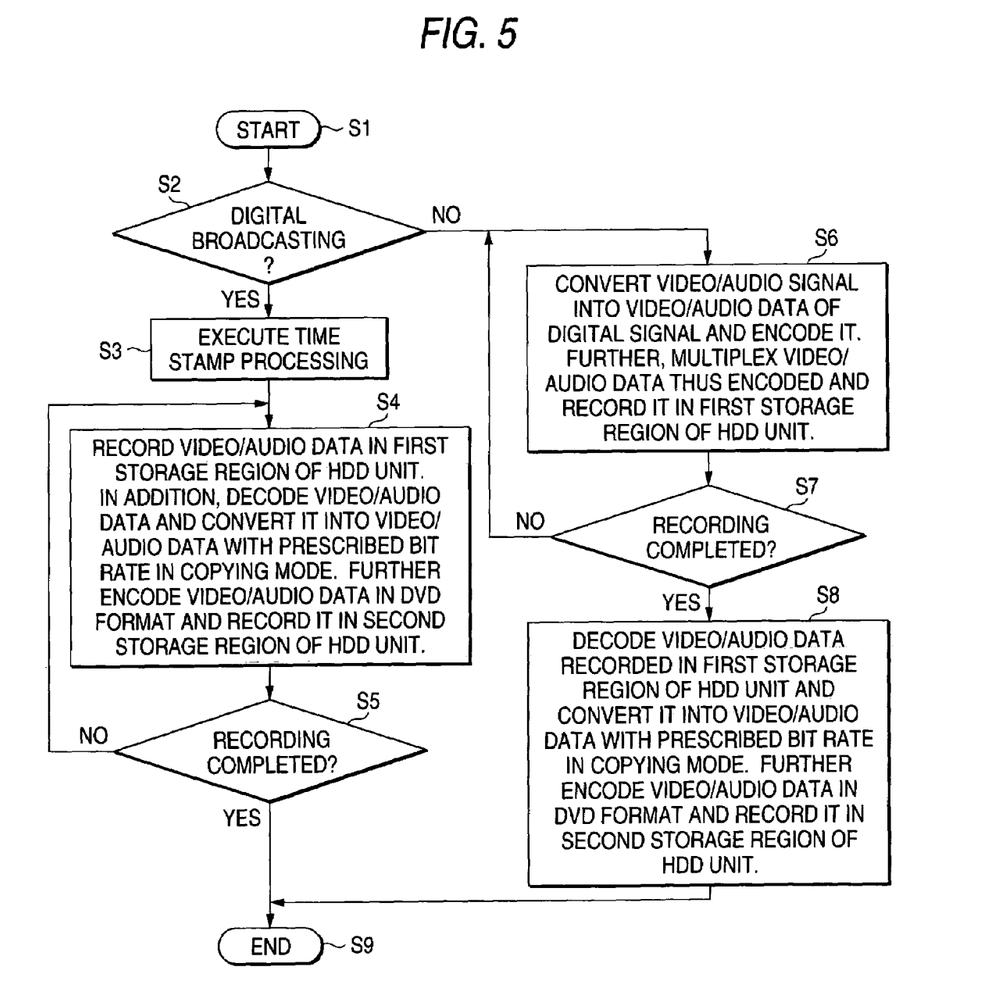
FIG. 5 is a flowchart showing a recording operation of the recording/reproducing apparatus according to an embodiment.
Figure 6:
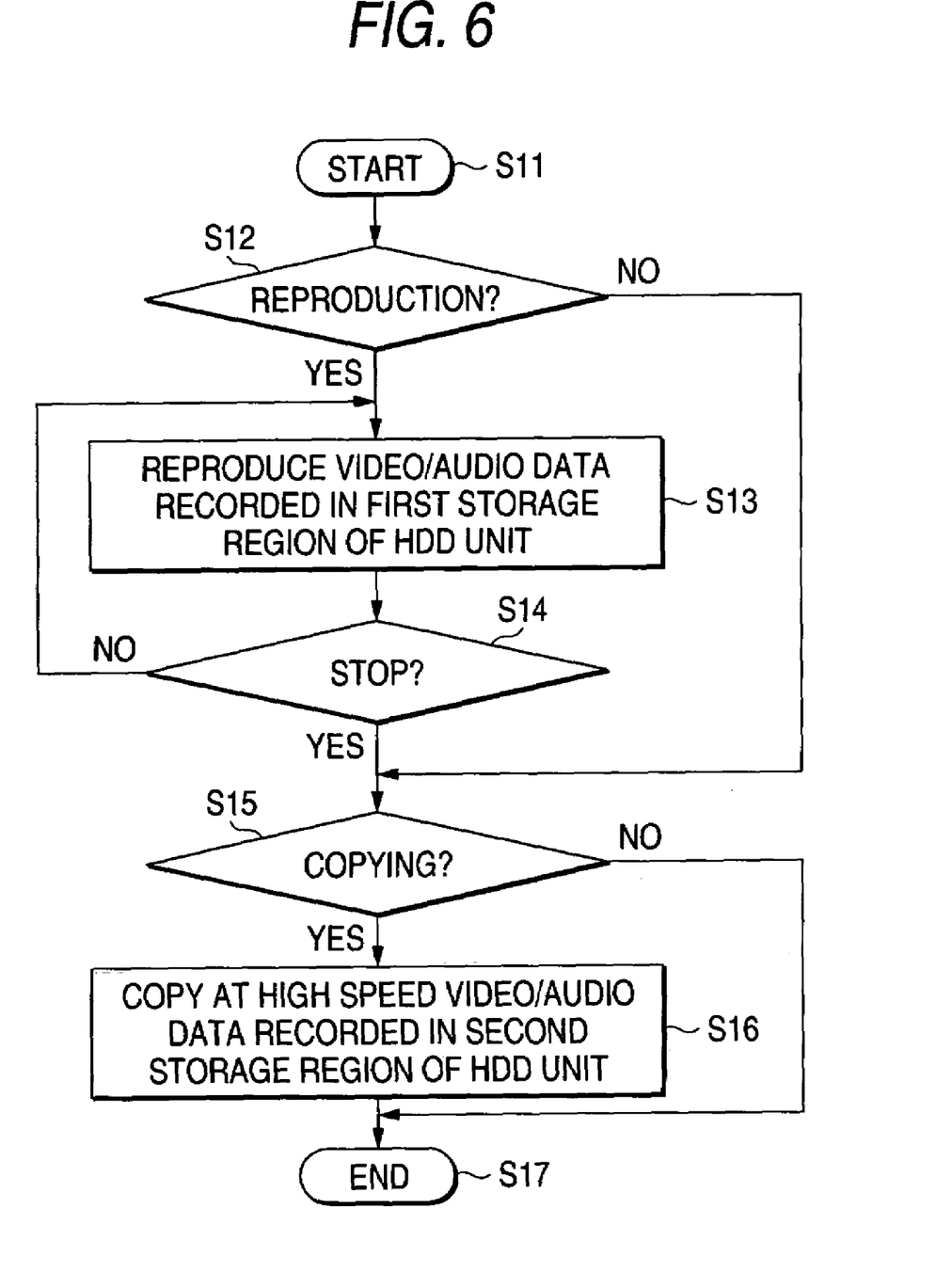
FIG. 6 is a flowchart showing a reproducing/copying operation of the recording/reproducing apparatus according to an embodiment.
Figure 7:
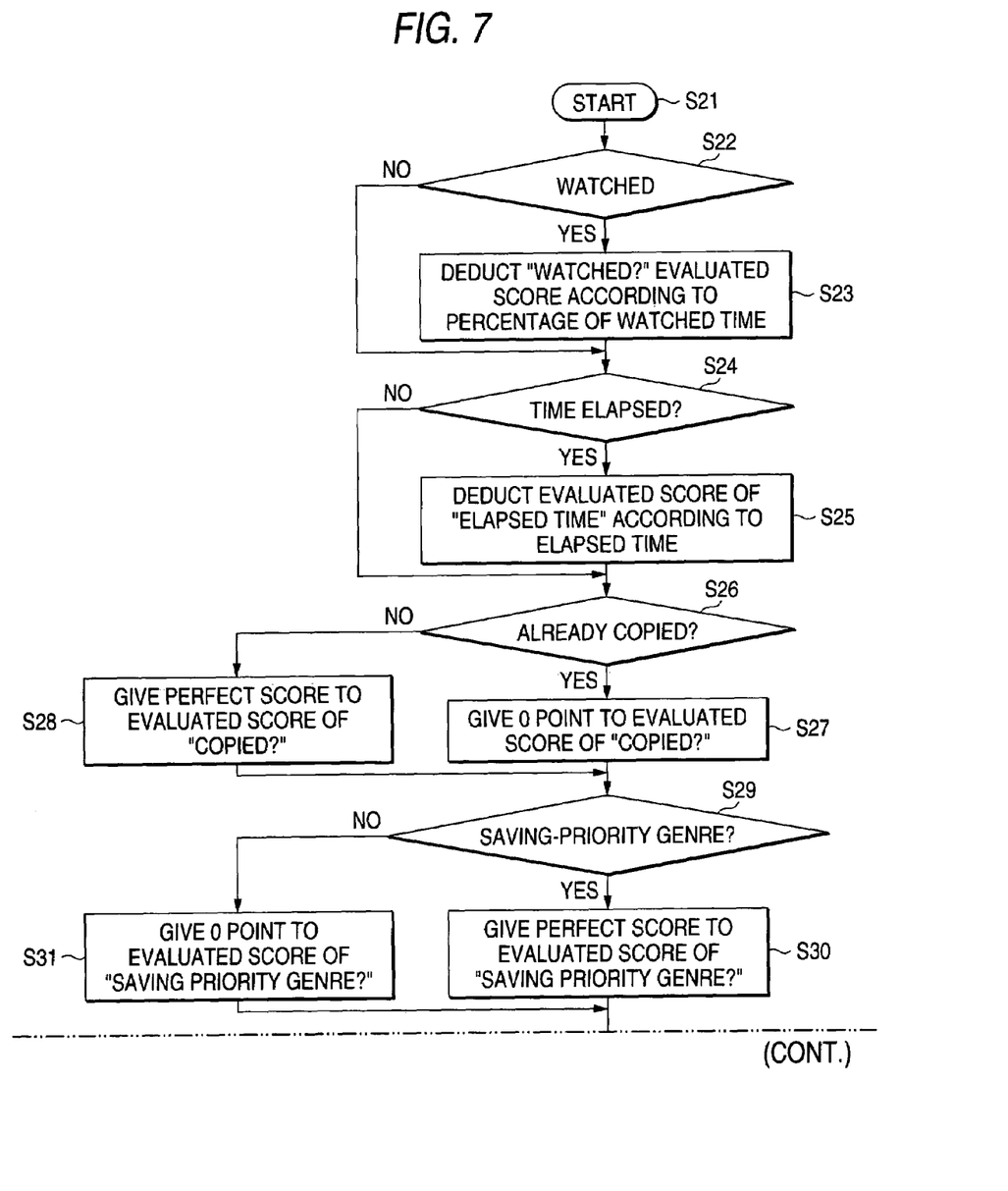
FIG. 7 is a flowchart showing an automated clean-up operation of the recording/reproducing apparatus according to an embodiment.

FIG. 1 is a block diagram showing the configuration of a recording/reproducing apparatus according to an embodiment of this invention. FIG. 2 is a view showing a remote controller of the recording/reproducing apparatus according to an embodiment of this invention. FIG. 3 is a view for explaining operation settings of the recording/reproducing apparatus according to an embodiment of this invention. FIG. 4 is a view for explaining an example of evaluated scores of the recording/reproducing apparatus according to an embodiment of this invention. FIG. 5 is a flowchart showing a recording operation of the recording/reproducing apparatus according to an embodiment of this invention. FIG. 6 is a flowchart showing a reproducing/copying operation of the recording/reproducing apparatus according to an embodiment of this invention. FIG. 7 is a flowchart showing an automated clean-up operation of the recording/reproducing apparatus according to an embodiment of this invention.

First, referring to FIG. 1 which is a block diagram showing the configuration of a recording/reproducing apparatus according to an embodiment, the configuration of the recording/reproducing apparatus will be explained.

A recording/reproducing apparatus 1 includes: an HDD unit 2 which is divided into a first storage region 2a and a second storage region 2b where video/audio data are recorded/reproduced for a hard disk; a DVD unit 3 for recording/reproducing the video/audio data for a DVD-R or DVD-RW; a storage control unit 4 for controlling the recording/reproducing operation for the HDD unit 2 and the DVD unit 3; a stream processing unit 5 for performing time-stamp processing of MPEG-TS (Moving Picture Coding Experts Group-Transport Stream), multiplexing of MPEG-PS (Moving Picture Coding Experts Group-Program Stream)/MPEG-TS, releasing of multiplexing of MPEG-PS/MPEG-TS and MPEG-PS/MPEG-TS conversion.

The recording/reproducing apparatus 1 further includes: a digital tuner 6 for receiving a digital broadcasting at a channel selected from the television broadcasting radio wave of the digital broadcasting received by an antenna 21; an analog tuner 7 for receiving an analog broadcasting at a channel selected from the television broadcasting radio wave of the analog broadcasting received by the antenna 21; an AD (Analog-Digital) converter circuit 8 for converting the video/audio data of the analog signal into the video/audio data of the digital signal; and an encoder 9 for encoding the video/audio data of the digital signal into the video/audio data of the analog signal compressed in an MPEG format.

The recording/reproducing apparatus 1 further includes: a resolution converting unit 10 for converting the video/audio data with a high bit rate into the video/audio data with a low bit rate; a decoder 11 for decoding the video/audio data of the digital signal extended from the video/audio data of the digital signal compressed in the MPEG format; a DA (Digital-Analog) converter circuit 12 for converting the video/audio data of the digital signal into the video/audio data of the analog signal; and an OSD (On-Screen Character Display) circuit 13 for displaying character information with a character information signal superposed on a video signal on a screen of a monitor device 40.

The recording/reproducing apparatus 1 further includes: a link-layer 14 for packet-transferring the video/audio data of the digital signal; a physical layer 15 for transmitting/receiving the video/audio data of the digital signal; a microcomputer for controlling the entire system of the recording/reproducing apparatus 1; a memory control unit 19 for controlling the read/write of data for a RAM (Random Access Memory) 17 and the read of data from a ROM (Read Only Memory) 18; and a remote controller receiving unit 20 for receiving a remote controller signal transmitted from a remote controller 30 and converting the remote controller signal into a predetermined electric signal.

Further, the remote controller 30, as shown in FIG. 2, is provided with a plurality of operating keys inclusive of a menu key 30a for commanding display of a menu screen, cursor keys 30b for selecting one of items displayed on the menu screen, an enter key 30c for deciding setting of the item selected by each of the cursor keys 30b, a reproducing key 30d for commanding reproduction of the video/audio data, and a stop key 30e for commanding stopping of the operation such as reproduction of the video/audio data. By operating these operating keys, the recording/reproducing apparatus 1 is caused to perform a desired operation.

An explanation will be given of the operation of the recording/reproducing apparatus constructed as described above.

When the operation key of the remote controller 30 is pressed, the remote controller transmits the remote controller signal of the operated operation key as an infrared ray remote controller signal. The remote controller receiving unit 20 receives the remote controller signal thus transmitted and converts it into a predetermined electric signal to be sent to the microcomputer 16.

The microcomputer 16, when it receives a remote controller signal of the menu key 30a of the remote controller 30, transmits the corresponding character information signal and a control signal to the OSD circuit 12 so that the menu screen (not shown) is displayed on the screen of the monitor device 40.

When high speed copying of the menu screen is selected by the key operation of the cursor keys 30b and the enter key 30c of the remote controller 30, the micron 16 transmits the corresponding character information and control signal to the OSD circuit 12 so that the screen for setting the high speed copying is displayed on a screen 40a of the monitor device 40 (FIG. 3A).

When ON/OFF of automated creation of copying data and a copying mode included in the items displayed on the screen for setting the high speed copying are set by the key operation of the cursor keys 30b and the enter key 30c of the remote controller 30, the microcomputer 16 transmits a control signal to the memory control unit 19 so that setting of the set high speed copying is stored in the RAM 17. If the copying mode is set at an XP mode, LP mode or EP mode, the video/audio data for one hour, four hours or six hours can be recorded on the DVD-RW or DVD-R.

When setting of automated clean-up of the menu screen (not shown) is selected by the key operation of the cursor keys 30b and the enter key 30c of the remote controller 30, the microcomputer 16 transmits the corresponding character information and control signal to the OSD circuit 12 so that the screen for setting the automated clean-up (canceling) is displayed on the screen 40a of the monitor device 40 (FIG. 3B).

When ON/OFF of the automated clean-up, saving period of recoded data, genre of the recorded data to be not canceled, saving period of copying data, genre of the copying data to be not canceled and ON/OFF of a locking function are set by the key operation of the cursor keys 30b and the enter key 30c of the remote controller 30, the microcomputer 16 transmits the control signal to the memory control unit 19 so that setting of the set automated clean-up is stored in the RAM 17.

The genres of the recorded data and copying data to be not canceled are selected from a movie, drama, sports, news, variety, etc.

When recording of the television broadcasting program in the digital broadcasting is started, the microcomputer 16 transmits the control signal to the digital tuner 6 so that the television broadcasting program in the digital broadcasting at the channel selected from the television broadcasting radio wave received by the antenna 21, transmits the control signal to the stream processing unit 5 so that the time stamp processing of the video/audio data of the television broadcasting program in the digital broadcasting is performed by the stream processing unit 5, and transmits the control signal to the storage control unit 4 so that the video/audio data of the received television broadcasting program in the digital broadcasting is recorded in the first storage region 2a of the HDD unit 2.

In a case where setting the automated creation of the copying data is ON, the microcomputer 16 transmits the control signal to the encoder 9, resolution converting unit 10 and decoder 11 so that in background processing, the video/audio data of the received television broadcasting program in the digital broadcasting is decoded by the decoder 11, the decoded video/audio data is converted into the video/audio data with the bit rate in a preset copying mode by the resolution converting unit 10 and the video/audio data with the converted bit rate is encoded in the DVD format by the encoder 9, thereby recording the encoded video/audio data in the second storage region 2b of the HDD 2 as the copying data.

On the other hand, when recording of the television broadcasting program in the digital broadcasting is started, the microcomputer 16 transmits the control signal to the analog tuner 7 so that the television broadcasting program in the digital broadcasting at the channel selected from the television broadcasting radio wave received by the antenna 21 and transmits the control signal to the encoder 9, resolution converting 10 and decoder 11 so that the video/audio data of the received television broadcasting program is converted into encoded video/audio data of the digital signal and the encoded video/audio data is multiplex-recorded in the first storage region 2a of the HDD unit 2.

If setting the automated creation of the copying data is ON, when recording of the television broadcasting program has been completed, the microcomputer 16 transmits the control signal to the storage control unit 4, stream processing unit 5, encoder 9, resolution converting 10 and decoder 11 so that the video/audio data recorded in the first storage region 2a of the HDD unit 2 is decoded by the decoder 11, the decoded video/audio data are converted into the video/audio data with the bit rate in the preset copying mode by the resolution converting unit 10 and the video/audio data with the converted bit rate are encoded in the DVD format by the encoder 9, thereby recording the encoded video/audio data in the second storage region 2b of the HDD 2 as the copying data.

The microcomputer 16, when it receives the remote controller signal of the reproducing key 30d of the remote controller 30, transmits the control signal to the storage control unit 4, decoder 11 and DA converter circuit 12 so that the video/audio data of the digital in the television broadcasting program recorded in the first storage region 2a of the HDD unit 2 is decoded by the decoder 11 and the decoded video/audio data of the digital signal is converted into the video/audio signal of the analog signal by the DA converter circuit 12. The micron 16 transmits the video/audio signal thus converted to the monitor device 40 so that the video/audio data of the recorded television broadcasting program is reproduced.

The microcomputer 16, when it receives the remote controller signal of the stop key 30e of the remote controller 30, transmits the control signal to the storage control unit 4 so that reproduction of the video/audio data of the television broadcasting program recorded in the first storage region 2a of the HDD unit 2 is stopped.

When copying of the menu screen (not shown) of the monitor device 30 into the DVD is selected by the key operation of the menu key 30a of the remote controller, the microcomputer 16 transmits the control signal to the storage control unit 4 to transfer the video/audio data recoded as the copying data in the second storage region 2b to the DVD unit 3 so that the copying data is copied on the DVD at a high speed.

The video/audio data recoded as the copying data in the second storage region 2b of the HDD unit 2 is converted into the video/audio data with the bit rate in the preset copying mode. Since the video/audio data thus converted has been already encoded in the DVD format, the video/audio data, without being subjected to the encoding processing, is transferred to the DVD at the highest transfer speed and copied in the DVD at the high speed.

Next, an explanation will be given of the operation of the automated clean-up of the recording/reproducing apparatus 1. Where recording of a television broadcasting program has been completed, or when the operation of the recording/reproducing apparatus 1 is stopping, whenever a predetermined time elapses, the microcomputer 16 transmits the control signal to the storage control unit 4 to evaluate the respective evaluated scores of a plurality of evaluating items of "ON/OFF of locking function", "watched? (degree of watching)", "elapsed time after recording", "copied?", "saving priority (preferred) genre", and "continuously watched?" of the tag data of each of the video/audio data recorded in the first storage region 2a and second storage region 2b of the HDD unit 2, thereby totaling the evaluated scores to evaluate the saving priority of each of the video/audio data.

The evaluated score of "watched?" is evaluated by the percentage of the watched time of the video/audio data. A non-watched case is given a prescribed perfect score. According to the percentage of the watched time of the whole recording time of the video/audio data, the "watched?" evaluated score is deducted. For example, with the "watched?" evaluated score being 100 points for the non-watched case, if 98% of the video/audio data has been watched, the evaluated score of 2 points is deducted. Incidentally, while the recorded television broadcasting program is being watched, the "watched ?" evaluated score may be deducted according to the percentage of the watched time when a predetermined time, e.g. one minute elapses.

As regards the evaluated score of the "elapsed time after recording", with the score immediately after the recording being given a perfect score, it is deducted whenever a predetermined time after recording. For example, with the evaluated score of the "elapsed time after recording" being 100 points for the case immediately after recording, 7 points are deducted whenever one day elapses. As regards the evaluated score of the "copied?", with a non-copied case being given a predetermined perfect score, e.g. 10 points, a copied case is given 0 point.

As regards the evaluated score of the "saving priority (preferred) genre", the pertinent program belonging to the saving priority genre is given a predetermined perfect score, e.g. 100 points, whereas the pertinent program not belonging to the saving priority genre is given 0 point.

As regards the evaluated score of the "continuously watched?", the score corresponding to the number of times of recording the video data during the continuous watching is given. For example, if the number of times of recording at that time is 6 (six), 6 points are given. Incidentally, the video/audio data during continuous watching, when a predetermined number of days elapses, will be canceled. For example, the pertinent video/audio data being continuously watched after three months has elapsed after recording will be canceled.

When shortage in the empty capacity of the first storage region 2a of the HDD unit 2 occurs, the video/audio data recorded with a lower saving priority is cancelled from the first storage region 2a of the HDD unit 2 thereby assuring an empty capacity therein. When shortage in the empty capacity of the second storage region 2b of the HDD unit 2 occurs, the recorded video/audio data recorded as the copying data with a lower saving priority is cancelled from the second storage region 2b of the HDD unit 2 thereby assuring an empty capacity therein.

When the empty capacity of each of the first storage region 2a and second storage region 2b of the HDD unit 2 is smaller than a predetermined empty capacity, for example, as shown in FIG. 4, the evaluated scores of the plurality of evaluating items of the video audio data are totaled so that saving priority of the pertinent audio/video data is evaluated. In this case, with the program A with ON of the locking function being excluded from the object for clean-up or canceling, the video/audio data of the program B with the totaled evaluated score of 153 points, the video/audio data of the program D with the totaled evaluated score of 172 points, the video/audio data of the program C with the totaled evaluated score of 209 points are cleaned up or cancelled in this order, thereby assuring the empty capacity of each of the first and the second storage region of the HDD unit 2.

As the empty capacity of the first storage region 2a of the HDD unit 2, for example, about 65 GB may be assured so that the video/audio data in the XP mode of 24 Mbps can be recorded for 6 (six) hours. As the empty capacity of the second storage region 2b of the HDD unit 2, for example, about 14 GB may be assured so that the video/audio data in an SP mode of 5 Mbps can be recorded as the copying data of the video/audio data in the XP mode recorded for 6 (six) hours can be recorded.

Now referring to the flowchart of FIG. 5, an explanation will be given of the recording operation of the recording/reproducing apparatus according to an embodiment.

When recording of a television broadcasting program is started (step S1), the processing for the recording operation proceeds to step S2. In step S2, whether or not a received television broadcasting is a digital broadcasting is determined. If the received television broadcasting is the digital broadcasting, the processing proceeds to step S3. If the received television broadcasting is not the digital broadcasting but an analog broadcasting, the processing proceeds to step S6.

In step S3, the time stamp processing for the video/audio data of a television broadcasting program in the received digital broadcasting is executed. In step S4, the video/audio data of the television broadcasting program in the received digital broadcasting is recorded in the first storage region of the HDD unit. In addition, in background processing, the video/audio data of the television broadcasting program in the received digital broadcasting is decoded and converted into the video/audio data with a prescribed bit rate in a copying mode. The video/audio data with the bit rate converted is encoded in a DVD format and recorded as copying data in the second storage region of the HDD unit. The processing proceeds to step S5.

In step S5, it is determined whether or not recording of the television broadcasting program has been completed. If the recording of the television broadcasting program has been completed, the processing proceeds to step S9, thus ending the processing for the recording operation. If recording of the television broadcasting program has not been completed, the processing returns to step S4. Thus, the processing from step S4 will be repeated.

In step S6, the video/audio signal of the television broadcasting program in the received analog broadcasting is converted into the video/audio data of a digital signal and encoded.

The video/audio data thus encoded is multiplexed and recorded in the first storage region of the HDD unit. The processing proceeds to step S7.

In step S7, it is determined whether or not recording of the television broadcasting program has been completed. If the recording of the television broadcasting program has been completed, the processing proceeds to step S8. If recording of the television broadcasting program has not been completed, the processing returns to step S6. The processing from step S6 will be repeated.

In step S8, the video/audio data recorded in the first storage region of the HDD unit is decoded and converted into the video/audio data with a prescribed bit rate in a copying mode. The video/audio data with the bit rate converted is encoded in a DVD format and recorded as copying data in the second storage region of the HDD unit. The processing proceeds to step S5, thus ending the processing for the recording operation.

Next, referring to the flowchart of FIG. 6, an explanation will be given of the reproduction/copying operation of the recording/reproducing apparatus according to an embodiment of this invention.

When reproduction or copying of the video/audio data is commanded by a key operation of the remote controller (step S11), the processing for the reproduction/copying operation proceeds to step S12. In step S12, it is determined whether or not the reproduction of the video/audio data has been commanded by the key operation of the remote controller. If the reproduction of the video/audio data has been commanded, the processing proceeds to step S13. If the reproduction of the video/audio data has been commanded, the processing proceeds to step S15.

In step S13, the video/audio data of the television broadcasting program recorded in the first storage region of the HDD unit is reproduced. The processing proceeds to step S14.

In step S14, it is determined whether or not stopping of the reproduction of the video/audio data has been commanded by the key operation of the remote controller. If the stopping of the reproduction of the video/audio data has been commanded, the processing proceeds to step S15. If the stopping of the reproduction of the video/audio data has not been commanded, the processing returns to step S13. Thus, the processing from step S13 will be repeated.

In step S15, it is determined whether or not copying of the video/audio data into a DVD in the DVD unit has been commanded by the key operation of the remote controller. If the copying of the video/audio data into the DVD in the DVD unit has been commanded, the processing proceeds to step S16. If the copying of the video/audio data onto the DVD in the DVD unit has not been commanded, the processing proceeds to step S17, thus ending the processing for the reproduction/copying operation.

In step S16, the video/audio data as the copying data recorded on the second storage region of the HDD unit are transferred to the DVD unit and copied onto the DVD in the DVD unit at a high speed. The processing proceeds to step S17, thus ending the processing for the reproduction/copying operation.

Next, referring to the flowchart of FIG. 7, an explanation will be given of the automated clean-up operation of the recording/reproducing apparatus according to an embodiment of this invention.

Where recording of a television broadcasting program has been completed, or while the operation of the recording/reproducing apparatus stops, whenever a predetermined time elapses, the processing for the automated clean-up operation proceeds from step S21 to step S22. In step S22, it is determined whether or not the video/audio data recorded in the first storage region of the HDD unit has been watched or viewed. If the video/audio data recorded in the first storage region of the HDD unit have been watched, the processing proceeds to step S23. If the video/audio data recorded in the first storage region of the HDD unit has not been watched, the processing proceeds to step S24.

In step S23, according to the percentage of the watched time of the whole recording time of the video/audio data recorded in the first storage region of the HDD unit, the "watched?" evaluated score of the video/audio data recorded in the first storage region of the HDD unit is deducted. The processing proceeds to step S24.

In step S24, it is determined whether or not a prescribed time has elapsed after the video/audio data recorded in the first and the second storage region of the HDD unit was recorded. If a prescribed time has elapsed after the video/audio data recorded in the first and the second storage region of the HDD unit was recorded, the processing proceeds to step S25. If a prescribed time has not elapsed after the video/audio data recorded in the first and the second storage region of the HDD unit was recorded, the processing proceeds to step S26.

In step S25, according to the elapsed time after the video/audio data recorded on the first and the second storage region of the HDD unit has been recorded, the evaluated score of the "elapsed time after recording" is deducted. The processing proceeds to step S26. In step S26, it is determined whether or not the video/audio data recorded as the copying data in the second storage region of the HDD unit has been already copied. If the video/audio data recorded as the copying data in the second storage region of the HDD unit has been already copied, the processing proceeds to step S27. If the video/audio data recorded as the copying data in the second storage region of the HDD unit has not been yet copied, the processing proceeds to step S28.

In step S27, the "copied?" evaluated score of the video/audio data recorded as the copying data in the second storage region of the HDD unit is given 0 point. The processing proceeds to step S29.

In step S28, the "copied?" evaluated score of the video/audio data recorded as the copying data in the second storage region of the HDD unit is given a prescribed perfect score. The processing proceeds to step S29.

In step S29, it is determined whether or not the genre of the video/audio data recorded in the first and the second storage region in the HDD unit is a "saving priority (preferred) genre". If the genre of the video/audio data recorded in the first and the second storage region in the HDD unit is the "saving priority (preferred) genre", the processing proceeds to step S30. If the genre of the video/audio data recorded in the first and the second storage region in the HDD unit is not the "saving priority (preferred) genre", the processing proceeds to step S31.

In step S30, the evaluated score of the genre of the video/audio data recorded in the first and the second storage region in the HDD unit is given a prescribed perfect score. The processing proceeds to step S32.

In step S31, the evaluated score of the genre of the video/audio data recorded in the first and the second storage region in the HDD unit is given 0 point. The processing proceeds to step S32.

In step S32, it is determined whether or not the television broadcasting program of the video/audio data recorded in the first storage region of the HDD unit has been continuously watched.

If the television broadcasting program of the video/audio data recorded in the first storage region of the HDD unit has been continuously watched, the processing proceeds to step S33. If the television broadcasting program of the video/audio data recorded in the first storage region of the HDD unit has not been continuously watched, the processing proceeds to step S35.

In step S33, the evaluated score of the "continuously watched?" is given the points corresponding to the recording number of times of the television broadcasting program being continuously watched recorded in the first storage region of the HDD unit. The processing proceeds to step S34.

In step S34, it is determined whether or not a predetermined number of days has elapsed after the video/audio data being continuously watched recorded in the first storage region of the HDD unit was recorded. If the predetermined number of days has elapsed after the video/audio data being continuously watched recorded in the first storage region of the HDD unit was recorded, the processing proceeds to step S36. If the predetermined number of days has not elapsed after the video/audio data being continuously watched recorded in the first storage region of the HDD unit was recorded, the processing proceeds to step S37.

In step S35, the evaluated score of the "continuously watched?" of the video/audio data being watched in the first storage region of the HDD unit is given 0 point. The processing proceeds to step S37.

In step S36, the video/audio data being continuously watched recorded in the first region of the HDD unit after the predetermined number of days has elapsed are cancelled. The processing proceeds to step S37.

In step S37, it is determined whether or not there is a predetermined empty capacity in each of the first and the second storage region of the HDD unit. If there is a predetermined empty capacity in each of the first and the second storage region of the HDD unit, the processing proceeds to step S39, thus ending the processing for the automated clean-up operation. If there is no predetermined empty capacity in each of the first and the second storage region of the HDD unit, the processing proceeds to step S38.

In step S38, the evaluated scores of the video/audio data recorded in the first and the second storage region of the HDD unit are totaled to evaluate the saving priority thereof. The video/audio data with a lower priority is cancelled from the first and the second storage region of the HDD unit. The processing proceeds to step S39, thus ending the processing for the automated clean-up operation.

Hitherto, the explanation has given of the best mode for carrying out this invention. This invention should not be limited to such a mode for carrying out this invention, but can be modified or improved within the common knowledge of those skilled in the art. For example, in the embodiment described above, the HDD unit was divided into two storage regions of the first storage region where the video/audio data of the television broadcasting program is recorded and the second storage region where the video/audio data for copying to be copied on the DVD is created. However, two, i.e. a first and a second HDD unit may be provided. In this case, in the first HDD unit, the video/audio data of the television broadcasting program is recorded whereas in the second HDD unit, the video/audio data for copying to be copied onto the DVD is created.

As described above, according to the embodiment, the recorded video/audio data is automatically cancelled to prevent shortage in the empty capacity in the storage region of the recording medium.

According to the embodiment, respective evaluated scores for a plurality of evaluation items of the video/audio data recorded in the first and second storage region are evaluated, and the evaluated scores are totaled to evaluate a saving priority of the video/audio data. In this configuration, by the totaled evaluated score of the respective evaluated scores for a plurality of evaluation items of the video/audio data recorded in the first and second storage region, the saving priority of the video/audio data can be evaluated.

According to the embodiment, the video/audio data with a lower saving priority recorded in the first and the second storage region of the first recording medium, exclusive of the video/audio data protection-set is cancelled. In this configuration, without canceling the video/audio data protection-set, the video/audio data with a lower saving priority recorded in the first and the second storage region of the first recording medium is cancelled so that shortage in the empty capacity in each of the first and the second storage region of the first recording medium can be prevented.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A recording/reproducing apparatus having a function of recording/reproducing video/audio data in a first recording medium divided into a first and a second storage region and copying the video/audio data in a second recording medium which is detachable, the recording/reproducing apparatus comprising:
    a first recording unit that records the video/audio data in the first storage region of the first recording medium;
    a decoding unit that decodes the video/audio data;
    a resolution converting unit that converts the video/audio data decoded by the decoding unit into video/audio data with a prescribed bit rate;
    an encoder unit that encodes the video/audio data with the bit rate converted by the resolution converting unit in a format of the second recording medium;
    a second recording unit that records the video/audio data encoded by the encoder unit in the second storage region of the first recording medium;
    a copying unit that copies the video/audio data recorded in the second storage region of the recording medium into the second recording medium;
    an evaluating unit that evaluates, whenever a predetermined time elapses, respective evaluated scores for a plurality of evaluation items of the video/audio data recorded in the first and second storage region, and totals the evaluated scores to evaluate a saving priority of the video/audio data recorded the first and the second storage region of the first recording medium;
    a detecting unit that monitors, whenever a predetermined time elapses, empty capacities of the first and the second storage region of the first recording medium to detect shortage in the empty capacities of the first and the second storage region of the first recording medium; and
    a canceling unit that cancels, when shortage in the empty capacities of the first and the second storage region of the first recording medium is detected, the video/audio data with a lower saving priority recorded in the first and the second storage region of the first recording medium, exclusive of the video/audio data protection-set.

2. A recording/reproducing apparatus having a function of recording/reproducing video/audio data in a first recording medium divided into a first and a second storage region and copying the video/audio data in a second recording medium which is detachable, the recording/reproducing apparatus comprising:
    a first recording unit that records the video/audio data in the first storage region of the first recording medium;
    a decoding unit that decodes the video/audio data;
    a resolution converting unit that converts the video/audio data decoded by the decoding unit into video/audio data with a prescribed bit rate;
    an encoder unit that encodes the video/audio data with the bit rate converted by the resolution converting unit in a format of the second recording medium;
    a second recording unit that records the video/audio data encoded by the encoder unit in the second storage region of the first recording medium;
    a copying unit that copies the video/audio data recorded in the second storage region of the recording medium into the second recording medium;
    an evaluating unit that evaluates, whenever a predetermined time elapses, a saving priority of the video/audio data recorded the first and the second storage region of the first recording medium;
    a detecting unit that monitors, whenever a predetermined time elapses, empty capacities of the first and the second storage region of the first recording medium to detect shortage in the empty capacities of the first and the second storage region of the first recording medium; and
    a canceling unit that cancels, when shortage in the empty capacities of the first and the second storage region of the first recording medium is detected, the video/audio data with a lower saving priority evaluated by the evaluating unit.

3. The recording/reproducing apparatus according to claim 2, wherein the evaluating unit evaluates respective evaluated scores for a plurality of evaluation items of the video/audio data recorded in the first and second storage region, and totals the evaluated scores to evaluate the saving priority of the video/audio data.

4. The recording/reproducing apparatus according to claim 2, wherein the canceling unit cancels the video/audio data with a lower saving priority recorded in the first and the second storage region of the first recording medium, exclusive of the video/audio data protection-set.

5. A recording/reproducing method for a recording/reproducing apparatus having a function of recording/reproducing video/audio data in a first recording medium divided into a first and a second storage region and copying the video/audio data in a second recording medium which is detachable, the method comprising:

recording the video/audio data in the first storage region of the first recording medium;

converting the video/audio data decoded into the video/audio data with a prescribed bit rate;

encoding the video/audio data with the bit rate converted in a format of the second recording medium and recording the video/audio data encoded in the second storage region of the first recording medium;

reproducing the video/audio data recorded in the first storage region of the first recording medium when reproduction of the video/audio data is commanded;

copying the video/audio data recorded in the second storage region of the recording medium into the second recording medium when copying of the video/audio data is commanded;

evaluating, whenever a predetermined time elapses, respective evaluated scores for a plurality of evaluation items of the video/audio data recorded in the first and second storage region, and totaling the evaluated scores to evaluate a saving priority of the video/audio data; and detecting, whenever a predetermined time elapses, shortage in empty capacities of the first and the second storage region of the first recording medium, and canceling, when the shortage in the empty capacities of the first and the second storage region of the first recording medium is detected, the video/audio data with a lower saving priority from the first and the second storage region of the first recording medium, exclusive of the video/audio data protection-set.

* * * * *